UNITED STATES PATENT OFFICE.

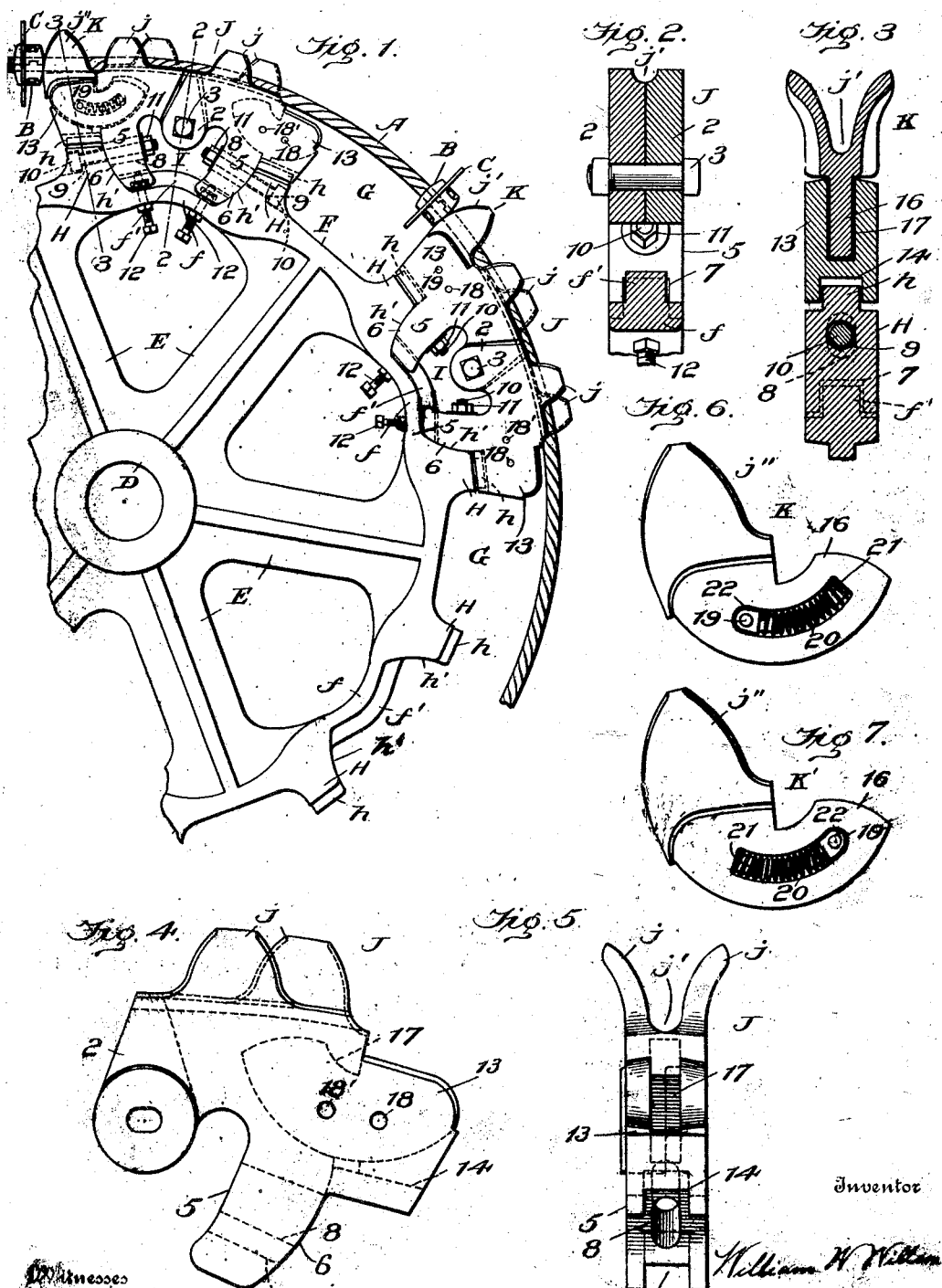

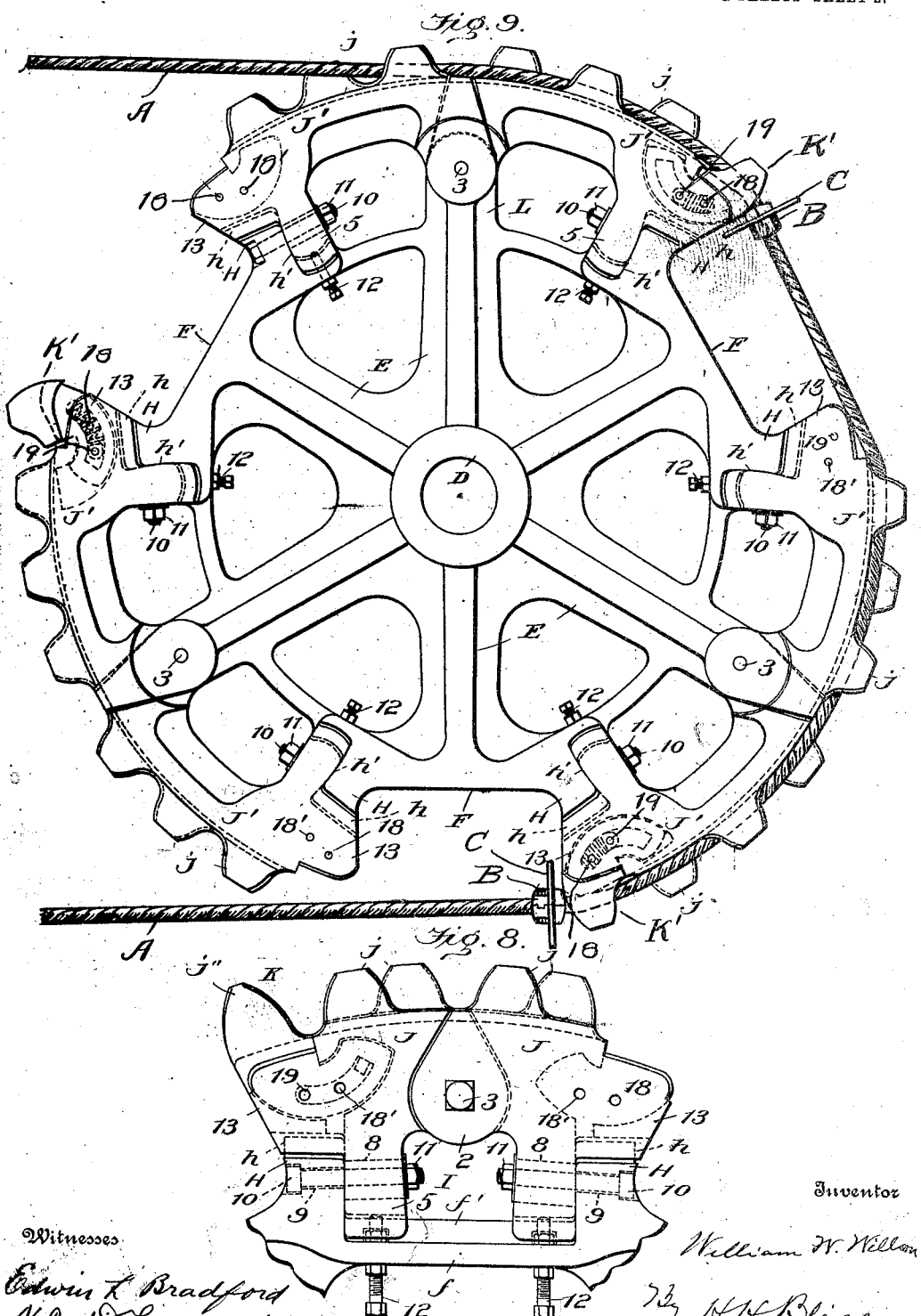

WILLIAM W. WILLSON, OF COLUMBUS, OHIO, ASSIGNOR, BY MESNE ASSIGNMENTS, TO THE JEFFREY MANUFACTURING COMPANY, A CORPORATION OF OHIO.

SPROCKET-WHEEL.

994,896.

Specification of Letters Patent. Patented June 13, 1911.

Application filed April 26, 1907. Serial No. 370,393.

*To all whom it may concern:*

Be it known that I, WILLIAM W. WILLSON, a citizen of the United States, residing at Columbus, in the county of Franklin and State of Ohio, have invented certain new and useful Improvements in Sprocket-Wheels, of which the following is a specification, reference being had therein to the accompanying drawing.

This invention relates to power transmitting apparatus in which a wire rope or cable is employed as the endless traveling element, and it consists of improvements in the wheels with which the cable engages. The advantages incident to the use of cables, in lieu of chains for instance, have long been recognized, but they are subject to this disadvantage, that the length of the cable is liable to considerable variation, owing to the stretching thereof under conditions of severe and long continued use. Such changes of course affect the pitch of the cable, and unless the pitch of the wheel with which it engages is correspondingly changed, the cable and wheel do not work well together.

It is the object of my invention to produce a wheel for use in power transmission systems wherein a wire rope or cable is employed, that is simple in construction, is adapted to have its pitch changed by simple mechanism and in an expeditious manner, and is provided with yielding teeth that are arranged to engage directly with the sprocket blocks carried by the cable.

In the accompanying drawings—Figure 1 is a side elevation of a wheel provided with one form of my invention, certain of the adjustable rim portions and sprocket teeth of the wheel being omitted. Fig. 2 is a section taken on the line 2—2 of Fig. 1. Fig. 3 is a section taken on the line 3—3 of Fig. 1. Fig. 4 is a detached view in side elevation of one of the members of the adjustable rim section that forms a seat for the cable. Fig. 5 is an end view of the parts represented in Fig. 4. Fig. 6 is a detached view of one of the yielding sprocket teeth of the wheel adapted for use on a driving wheel. Fig. 7 is a view of a tooth adapted to be used on a driven wheel. Fig. 8 is a view showing a slightly different form of the invention. Fig. 9 is a side view of a wheel embodying still another form of the invention.

In the drawings, A represents a wire rope or strand cable, B the contact members or blocks that are applied thereto, and C flights or other conveying attachments secured to the blocks B. The wheel with which the cable engages comprises essentially a central portion D adapted to be secured to a shaft, radiating spokes E and a rim F, these parts being preferably formed of cast metal and of integral construction. The wheel is provided with or carries a set of grooved, preferably toothed, adjustable rim sections with which the cable A engages, these adjustable rim sections being separated by gaps G.

Referring particularly to the form of my invention illustrated in Fig. 1, it will be observed that the rim F of the wheel is formed, adjacent to each gap G, with outward extending peripheral lugs or projections H, H. The portion $f$ of the wheel rim situated between the two projections that serve as supports for a single adjustable rim section is preferably depressed, as compared with the other parts of the wheel rim, and lies below a space I separating the projections. The rim is formed on its outer face with a centrally disposed longitudinal rib $f'$ for a purpose to be described. The outer face of each lug or projection is preferably formed with a centrally disposed longitudinal rib $h$, and its inner face is curved, as represented at $h'$, to form a seat against which rests a part of one of the adjustable cable-engaging rim sections. Each adjustable rim section is comprised of two parts that are duplicates of each other, one of these being represented in Figs. 4 and 5, and it being designated as an entirety by J. Each section, considered as a whole, is of approximately segmental shape and is provided with a series of staggered teeth $j, j$, between which is the groove $j'$, in which the cable is adapted to lie. Each of the parts J is formed at its inner end with a perforated lug 2 through which passes a bolt 3, uniting these two parts. The perforation through the lug is preferably somewhat elongated, as indicated in Fig. 4, to allow for the necessary adjustments and relative movements of the parts to be hereafter described. 5 represents an inward extending projection having a curved face 6 adapted to lie against the face $h'$ of one of the projections or lugs H. The lower end of this projection is preferably bifurcated, as indicated at 7, so as to straddle the rib $f'$. The projection 5 is longitudinally slotted, as indicated at 8, this slot being adapted to be brought into register with an aperture 9 formed in the projection or lug H. In this aperture, and extending through the slot 8, is a bolt 10, upon the screw-threaded end of which is mounted a nut 11, these two parts, the bolt and nut, constituting the means for clamping the adjustable section J to the wheel rim. In order to effect a substantially radial adjustment of the section J, I employ a screw-threaded bolt 12, which passes through the portion $f$ of the wheel rim and has its end bear against the inner end of the projection 5, preferably between the flanges 7 at the bifurcated end thereof.

The parts formed as thus described being assembled as indicated in Fig. 1, that is to say the two parts J being united by the connecting pin or bolt 3, and the inward extending projections 5 resting against the shoulders or bearing faces $h'$ of the wheel body, it will be readily seen how adjustments may be effected in order to vary the pitch of the wheel. Let it be supposed that the cable has stretched so that the distance between the blocks B has increased sufficiently to make it desirable to increase the pitch of the wheel. To accomplish this it is only necessary to loosen the nuts 11 and turn the screws 12 so as to force outward, beyond the positions indicated in Fig. 1, the parts J of the adjustable cable-engaging parts of the wheel. After the proper outward adjustments have been effected, the sections J are tightly secured in place against the projections of the wheel body by means of the nuts 11 and bolts 10.

I prefer to form the seats $h'$ and the faces 6 of the projections that engage therewith as represented in Fig. 1, that is curved, as, by so doing I am able to preserve the desired curvature of the cable-engaging parts of the rim under all adjustments, it being understood that the two parts of each adjustable rim section rock with reference to each other upon the pivot or bolt 3 whenever an adjustment is made. However, many of the desirable features of the invention will be preserved even should the engaging faces of the projections H and 5 be made plain, as indicated in Fig. 8.

Each part J of the adjustable rim section is formed with an outward extension 13 projecting beyond the bearing extension 5 and arranged to overlie the projection H, and preferably to straddle the rib $h$ thereof, the end surface of this projection being channeled or grooved, as indicated at 14, for that purpose. The projection 13 constitutes a seat and means of attachment for a yielding sprocket tooth, the tooth that is adapted to engage with the blocks B, B, secured to the cable.

In my Patent No. 649,563, dated May 15, 1900, I have described and set forth the advantages incident to the use of yielding sprocket teeth in a wheel adapted to be used for power transmission, and therefore it is unnecessary herein to repeat those advantages.

K indicates as a whole the yielding tooth. It is situated adjacent to a gap G, each adjustable rim section carrying one of these teeth, such tooth being located at the forward end of the section when a wheel is operating as a driver, and at the rear end of the section when the wheel is being driven. The parts of my adjustable cable-engaging rim section are of such construction that a wheel to which they are applied may drive or be driven in both directions, so that I make provision for attaching a yielding sprocket tooth to either end of each section as may be desired.

Each yielding tooth has a V-shaped portion $j'^z$ that is adapted to engage with the blocks or sprockets of the cable, and a supporting shank or stem 16. The latter is preferably in the form of a curved plate that is adapted to enter a socket 17 formed in the part J of the adjustable rim section. The walls of the part J constituting the sides of the chamber 17, in which the stem of the yielding sprocket tooth lies, are perforated, as indicated at 18, 18', and through one or the other of the perforations passes the bolt or pin 19 constituting the fulcrum about which the yielding sprocket tooth turns or slides. A spring 20 is arranged between a centering stud 21 carried by the stem of the sprocket tooth and an abutment piece 22 mounted upon the pin 19. This spring serves to maintain the sprocket tooth in its proper normal position. When the tooth K is upon the driving wheel it is situated, as already stated, at the forward end of the adjustable rim section of the wheel, and the pin 19 is passed through the outermost set of holes 18, the spring being then arranged between the abutment 22 and a stud 21 located near the inner end of the stem 16, the result being that the spring normally holds the yielding tooth close down upon the outer edge of the extension 13. This position is maintained by the yielding tooth as it is carried around by the wheel in engagement with one of the cable blocks until it reaches a point where the cable leaves the wheel along tangential lines. Here the tooth begins to swing outward under the action of its frictional engagement with the cable block and in opposition to the tension of its spring, the pressure between the tooth and cable block gradually diminishing until the tooth is free to be retracted by its spring. Thus the cable leaves the wheel quietly and without being subjected to the jerking and snapping action which is characteristic of cable drives when wheels with rigid sprocket teeth are employed.

When the wheel is to be driven by the cable, a yielding tooth K' is employed. The tooth differs from the yielding tooth K only in having the stud 21 at the outer rather than at the inner end of the arcuate slot formed in the shank 16 of the tooth, the spring 20 being reversed in its position, as will be clear from a comparison of Figs. 6 and 7. If the wheel were to be driven in the same direction as when it was the driving member, these teeth K' would be mounted in the ends of the rim sections opposite those in which the teeth K are mounted in Fig. 1. Otherwise, the teeth K' would be substituted for the teeth K. In either case, the pivot pins or bolts 19 are passed through the innermost holes 18' of the rim sections. When thus mounted the springs of the yielding teeth operate to force the teeth outward. (See Fig. 9.)

It is obvious that either a driving wheel or a driven wheel may be provided with yielding teeth at both ends of each of the ring sections, the wheel then being fitted, without any change of the teeth, to turn in either direction.

In Fig. 9 I have shown an embodiment of my invention differing in some of its details from that already described but retaining the principal features of advantage. In this construction the two parts J', J' of the adjustable rim section are not only united to each other, but are connected by the same bolt that unites them, with a part of the wheel body, such part being for convenience an extension L of one of the spokes of the wheel. The construction as shown in this figure embodies the yielding teeth K' which, as has been previously noted, adapt the wheel to be driven by the cable.

What I claim is:

1. A sprocket wheel for power transmission purposes, comprising a sprocket-carrying adjustable rim section, such section being formed of two parts flexibly connected together with which an endless cable engages, means for adjusting substantially radially the rim section, and means for holding it in place after adjustment, substantially as set forth.

2. A wheel for power transmission purposes, having an adjustable rim section with which an endless cable engages, such adjustable section comprising two parts, means for adjusting each of the said parts substantially radially independently of the other part, means for holding each part securely in position after adjustment, and means for connecting together the two parts of the rim section so as to permit them to move relatively to each other, substantially as set forth.

3. In a wheel for power transmission purposes, the combination of a wheel body provided with outward extending projections, adjustable rim sections with which an endless cable engages, each section being formed of two parts connected together so as to permit them to move freely independently, and each part having a bearing against a projection carried by the body of the wheel, means for adjusting the sections substantially radially of the wheel, and means for clamping the parts of the adjustable sections to the projections of the wheel body after they have been adjusted, substantially as set forth.

4. A wheel for power transmission purposes, consisting of a wheel body having outward extending projections formed with curved bearing faces $h'$, adjustable rim sections with which a cable engages, each formed of two parts J, J, united by a connecting bolt 3, and each part having a bearing extension with a curved face adapted to lie against a face $h'$, means for adjusting the parts of the sections substantially radially of the wheel, and means for clamping the sections against the supporting faces $h'$, substantially as set forth.

5. The combination with a strand cable and contact-blocks carried thereby, of a wheel body, a rim section carried by the wheel body with which the cable engages, the rim section at each of its ends being constructed to receive a separable yielding sprocket tooth, a separable yielding sprocket tooth arranged to be applied to either end of the said rim section of the wheel, and means for securing the said yelding sprocket tooth in place on the said drum section, substantially as set forth.

6. The combination with an endless strand cable and contact-blocks carried thereby, of a wheel body, separable rim sections with which the cable engages fitted to the wheel body, such rim sections being constructed to receive and support at either end a yielding sprocket tooth, means for adjusting the rim sections substantially radially of the wheel, a yielding sprocket tooth for engaging with the blocks on the cable, adapted to be applied to either end of each of the said adjustable rim sections, and means for securing the yielding sprocket teeth to the rim sections, substantially as set forth.

7. A wheel for power transmission purposes, having a series of rim sections separate from each other, with which a cable is adapted to engage, each section being provided at each end with a seat for a yielding sprocket and with two sets of bolt holes 18, 18', interchangeable yielding sprocket teeth fitted to the said seats in the rim sections, and bolts for uniting the yielding sprockets with the rim sections arranged to enter the bolt holes 18 or 18', accordingly as the wheel is to be used as a driving or a driven wheel, substantially as set forth.

8. A wheel for power transmission purposes having a series of segmental rim sections, each rim section being constructed at each end to receive a separable yielding sprocket tooth, a separable yielding sprocket tooth on each of the said rim sections, and means for securing the said tooth to the rim sections, substantially as set forth.

9. A wheel for power transmission purposes having a series of segmental rim sections, each comprising an element pivotally supported at one end and adjustable inward and outward at its other end, and means for securing said sections in adjusted position, substantially as set forth.

10. A wheel for power transmission purposes having a series of segmental rim sections, each comprising an element pivotally supported at one end and adjustable inward and outward at its other end, means for securing said sections in adjusted position, and a yielding sprocket tooth mounted on the swinging end of each of the said rim elements, substantially as set forth.

In testimony whereof I affix my signature, in presence of two witnesses.

WILLIAM W. WILLSON.

Witnesses:
FRANK T. TALBOT,
H. B. ALEXANDER.